(No Model.)

H. IRELAND.
CUTTLE FISH BONE HOLDER.

No. 249,361. Patented Nov. 8, 1881.

Witnesses
Harry Smith
James F. Tobin

Inventor
Howard Ireland
by his Attorneys
Howson and Sons

UNITED STATES PATENT OFFICE.

HOWARD IRELAND, OF CAMDEN, NEW JERSEY.

CUTTLE-FISH-BONE HOLDER.

SPECIFICATION forming part of Letters Patent No. 249,361, dated November 8, 1881.

Application filed February 9, 1881. (No model.)

*To all whom it may concern:*

Be it known that I, HOWARD IRELAND, a citizen of the United States, residing in Camden, New Jersey, have invented an Improvement in Cuttle-Fish-Bone Holders for Bird-Cages, of which the following is a specification.

The object of my invention is to so combine cuttle-fish shell for bird-cages with retaining-projections that it can be readily attached to the wires of a bird-cage in such a manner that the entire surface of the friable calcareous portion of the shell shall be easily accessible to the bird.

Figure 1:
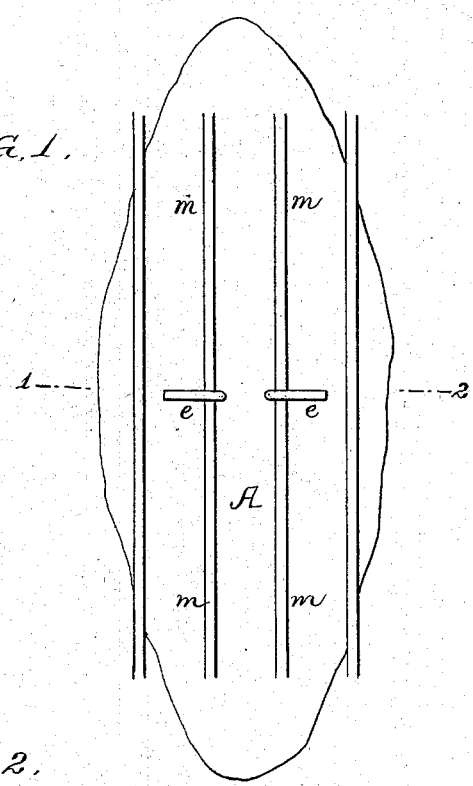
Figure 2:
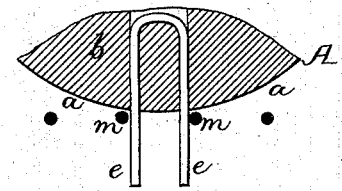
Figure 3:
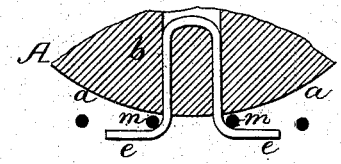
Figure 4:
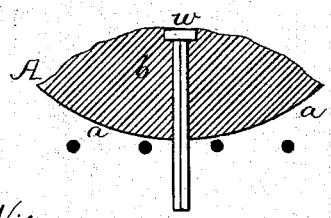
Figure 5:
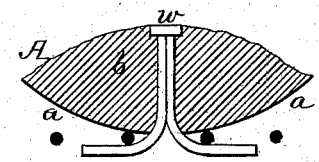

In the accompanying drawings, Figure 1 is a rear view of a piece of cuttle-fish shell with the attachment; Figs. 2 and 3, sectional plans on the line 1 2; and Figs. 4 and 5 represent a modification of my invention.

Pieces of cuttle-fish shell are in universal use in connection with bird-cages, for the purpose of enabling the birds to cleanse and sharpen their bills, and for affording the calcareous matter to which the birds are partial.

It has heretofore been usual to force the piece of shell between the wires of the cage and to rely upon the elasticity of these wires for retaining the shell in place. By this plan, however, the shell is generally presented in a position inconvenient for the bird—a difficulty which I obviate in the following manner:

A represents a piece of cuttle-fish shell of the usual size and form, adapted for use in connection with bird-cages, the back *a* of the shell consisting of a comparatively hard scale and the remainder *b* of the calcareous friable matter.

One of the simplest ways of carrying out my invention is that shown in Figs. 1, 2, and 3, in which a piece of flexible wire is bent to the staple-like form shown in Fig. 2 and the two legs passed through holes made in the shell, after which the wires projecting at the rear of the shell are bent, as shown at *e e*, Fig. 3. The wire thus becomes a permanent attachment to the shell, which can be readily applied to two bars, *m m*, of a cage by first passing the shell into the interior of the cage, then holding it in such a position that the projections at the rear will pass between two adjoining wires, and then twisting the shell and its attachment partly round until one projection catches against one wire and the other projection against the other wire, as shown in Fig. 1. If the projections are properly formed, a slight effort will be required to turn the shell to the position shown, and consequently the hard back of the shell will be pressed with sufficient force against the inside of the wires of the cage to insure the proper retention of the said shell in place.

The advantages of my invention are, first, the facility with which the shell may be securely attached to, and as easily removed from, the wires of the cage; and, secondly, the presentation of the entire soft portion of the shell in the most convenient position for the bird.

A piece of flat wire may be bent to the condition shown in Fig. 4, so as to present a head, *w*, and two adjoining legs, which may be first passed through a hole in the shell and then bent outward, as shown in Fig. 5, so as to form the desired projections at the rear.

It should be remarked that the projections should be essentially a part of the shell, so as to be sold with the same, and the best plan of making the projections a part of the shell is to pass a wire or wires through the same, and then bend the wires in the manner described, as this bending may be accomplished without disturbing the integrity of the shell, owing to the hard scaly back of the same.

I claim as my invention—

1. As a new article of manufacture and sale, a piece of cuttle-fish shell having at the back or scaly side two curved projections, *e e*, as and for the purpose set forth.

2. The combination of a piece of cuttle-fish shell with a wire or wires passing through the same, embedded and retained in the friable portion of the shell and bent at the scaly back, all substantially as set forth.

In testimony whereof I have signed my name to this specification in the presence of two subscribing witnesses.

HOWARD IRELAND.

Witnesses:
JAMES F. TOBIN,
HARRY SMITH.